United States Patent
Muschik et al.

(10) Patent No.: US 6,871,514 B2
(45) Date of Patent: Mar. 29, 2005

(54) METHOD OF MAKING GLASS, A METHOD AND DEVICE FOR THE CONTROL AND SETTING OF THE REDOX STATE OF REDOX FINING AGENTS IN A GLASS MELT

(75) Inventors: Wolfgang Muschik, Budenheim (DE); Hildegard Römer, Karben (DE); Rainer Eichholz, Mainz (DE); Paul Kissl, Mainz (DE); Johann Collignon, Mitterteich (DE); Reinhard Zintl, Marktredwitz (DE)

(73) Assignee: Schott Glas, Mainz (DE)

( * ) Notice: Subject to any disclaimer, the term of this patent is extended or adjusted under 35 U.S.C. 154(b) by 347 days.

(21) Appl. No.: 09/943,645

(22) Filed: Aug. 30, 2001

(65) Prior Publication Data

US 2002/0092325 A1 Jul. 18, 2002

(30) Foreign Application Priority Data

Aug. 31, 2000 (DE) .......................... 100 42 771

(51) Int. Cl.[7] .......................... C03B 5/225; C03B 5/193
(52) U.S. Cl. ...................... 65/33.9; 65/134.3; 65/134.4; 65/134.5
(58) Field of Search ................. 65/33.8, 33.9, 65/134.3, 134.4, 134.5

(56) References Cited

U.S. PATENT DOCUMENTS

| | | | | |
|---|---|---|---|---|
| 2,254,079 A | * | 8/1941 | McAlpine | .......... 65/30.1 |
| 2,331,052 A | | 10/1943 | Shadduck | |
| 2,387,222 A | * | 10/1945 | Wright | .......... 65/32.5 |
| 3,779,734 A | * | 12/1973 | Simonfi et al. | .......... 65/134.3 |
| 4,545,800 A | | 10/1985 | Won et al. | |
| 5,006,144 A | | 4/1991 | Knavish et al. | |
| 5,807,417 A | * | 9/1998 | Boulos et al. | .......... 65/134.3 |
| 6,080,694 A | * | 6/2000 | Boulos et al. | .......... 501/70 |
| 6,170,292 B1 | * | 1/2001 | Boulos et al. | .......... 65/30.1 |
| 6,250,110 B1 | * | 6/2001 | Boulos et al. | .......... 65/99.2 |
| 6,408,650 B1 | * | 6/2002 | Boulos et al. | .......... 65/134.3 |
| 6,588,234 B1 | * | 7/2003 | Kiefer et al. | .......... 65/134.3 |
| 2002/0000100 A1 | * | 1/2002 | Burg et al. | .......... 65/134.3 |

FOREIGN PATENT DOCUMENTS

| | | |
|---|---|---|
| DE | 4207059 | 10/1993 |
| DE | 4313217 | 1/1994 |
| DE | 19746715 | 4/1999 |
| EP | 0261725 | 3/1988 |
| GB | 2264706 | 9/1993 |

* cited by examiner

Primary Examiner—Sean Vincent
(74) Attorney, Agent, or Firm—Nils H. Ljungman & Associates

(57) ABSTRACT

There is now provided a method and a device for the control and setting of the redox state of redox fining agents in a glass melt, in which method, during the melting process, essentially oxygen gas is blown through the glass melt.

20 Claims, 1 Drawing Sheet

METHOD OF MAKING GLASS, A METHOD AND DEVICE FOR THE CONTROL AND SETTING OF THE REDOX STATE OF REDOX FINING AGENTS IN A GLASS MELT

BACKGROUND OF THE INVENTION

1. Field of the Invention

This invention relates to a method and a device for the control and setting of the redox state of redox fining agents in a glass melt.

2. Background Information

With reference to glass melts, fining or refining is the name given to the process of removing gas bubbles from the glass melt. To achieve the maximum freedom from foreign gas and bubbles, the molten batch must be thoroughly mixed and degasified.

Glass melting furnaces can be regarded as chemical reactors. Raw materials are converted by a large number of solid state or solid/liquid state reactions, in these reactors into a homogeneous melt, without unmolten material, without bubbles or other inhomogeneities. Generally, fossil fuel flames directly heat the melt, mainly by radiatiative heat transfer. Respective flows are determined by free convection due to temperature gradients and forced convection due to stirring and the pull. The raw materials are heated up to 500–600 degrees Celsius before the first solid state reactions take place. Secondly primary melt phases appear at about 1000 degrees Celsius. Sand grains dissolve or react in these liquid phases forming a viscous melt. Eventually all the raw materials are completely molten at a temperature of about 1300 degrees Celsius.

The melt contains dissolved gases and large numbers of small bubbles. By adding a fining agent to the batch of raw material, the bubbles and gases can be removed. Due to chemical reactions, often redox reactions, dissolved fining agents start to decompose at relatively high temperatures. The decomposition of the fining agents produces gases which diffuse in the existing bubbles. These bubbles will grow and will remove the dissolved gases present in the melt. Large bubbles will ascend in the melt up to the surface sometimes forming foam layers.

After the removal of the bubbles, homogenization and thermal conditioning takes place, this is mainly a physical process but diffusion will contribute to the elimination of concentration profiles.

All these processes: melting-in, dissolution of sand grains, degassing, homogenization take place in one space.

Residence time analysis shows that the glass melt can follow very different flow trajectories. The minimum residence time is about 15 up to 25% of the mean residence time but the maximum residence time can be several times the mean residence time. The glass melt volume will be exposed to a certain temperature history during melting, fining and homogenization dependent on the trajectory.

Due to the broad residence time distribution and fluctuations in parameters which influence the melting process, the glass quality is often far from stable and the part of the glass melt following the critical trajectory in the furnace (low residence time value and low temperature levels) may spoil the glass melt delivered to the forming sections of the glass production line.

In a float process, the raw materials for the glass are typically added together in a furnace, where they are mixed and melted. As the various glass constituents melt, they release gas. That is potentially a problem because some of the gas may remain trapped as small bubbles in the glass. If the bubbles remain in the final product, they result in visible imperfections in the glass. To avoid that problem, various melting and fining aids are added to the glass mixture in the furnace. Sodium sulfate ($Na_2SO_4$) is one such additive. In the mixture, much of the sulfate decomposes into sulfur dioxide and oxygen. Those gases cause the trapped gas bubbles to dissipate, leaving few visible imperfections in the glass. Some of the sulfate introduced into the batch remains dissolved in the glass composition, but it is colorless and has no effect on the transmittance properties of the glass.

The behavior of gases and or bubbles in a glass melt and the removal of gases and bubbles is described, for example, in "Glastechnische Fabrikationsfehler" [Manufacturing Defects in Industrial Glass], edited by H. Jebsen-Marwedel and R. Brückner, 3rd Edition, 1980, Springer Verlag, on pages 195 ff.

The fining methods used are most frequently chemical. The principle of these methods is that compounds are added to the glass melt that decompose and give off gases or compounds that are volatile at elevated temperatures or compounds that give off gases in an equilibrium reaction at elevated temperatures.

The latter group of substances comprises redox fining agents such as, for example, arsenic oxide and antimony oxide, but also $SnO_2$, $CeO_2$, $Fe_2O_3$, $ZnO$, $TiO_2$, $V_2O_5$, $MoO_3$, $WO_3$, $Bi_2O_5$, $Cr_2O_3$ and $MnO$. The redox fining agents used are polyvalent ions that exist in at least two oxidation stages that are in a temperature-dependent equilibrium with each other, whereby a gas, usually oxygen, is released at high temperatures.

The redox equilibrium of the substance dissolved in the glass melt can be illustrated with the example of arsenic oxide by Equation (I):

$$As_2O_5 \leftrightarrows As_2O_3 + O_2 \uparrow$$

The equilibrium constant K in Equation (I) can be formulated as in Equation (II):

$$K(T) = \frac{aAs_2O_3 \cdot pO_2}{aAs_2O_5}$$

In this equation, $aAs_2O_3$ and $aAs_2O_5$ are the activities of the arsenic trixoide or arsenic pentoxide and $pO_2$ is the fugacity of the oxygen.

The equilibrium constant K is dependent to a very great extent on the temperature, and a defined oxygen fugacity $pO_2$ can be set by mans of the temperature and the activity of the oxide arsenic compounds.

There are essentially three types of chemical fining:
1) a primary fining effect, during which the gases that form during the decomposition of the added fining agents, e.g. oxygen gas from redox fining agents, diffuse into the bubbles that originate during the decomposition of the batch, such as, for example $CO_2$, $N_2$, $H_2O$, NO and/or NO bubbles;
2) a secondary fining effect in which there is a degasification of the glass melt, during which there is a spontaneous formation of gas bubbles from the added fining agents, e.g. $O_2$ bubbles from redox fining agents. Foreign gases such as $CO_2$, $H_2O$, $N_2$, NO and/or $NO_2$ can diffuse into these fining bubbles, even if their partial pressure is less than $10^5$ Pa, and
3) a resorption effect, during which any expanded bubbles that originated as described in 1) or 2) above and are still in the melt when the temperature decreases are dissolved, for example by the oxygen, for example at redox equilibrium (I) by shifting the equilibrium to the side of the educt.

The release of the fining gases frequently occurs as early as during the melting and the fining gases are no longer available for the secondary fining effect. Only the primary fining effect takes place. Conventional redox fining agents such as $As_2O_5$ or $Sb_2O_5$ have an effective fining oxygen release between 1150 degrees Celsius and 1500 degrees Celsius with a maximum at 1220 degrees Celsius to 1250 degrees Celsius, whereby the respective oxygen release, in addition to the temperature, is essentially a function of the composition of the glass and the composition of the fining agent (one or more fining agents). In particular for glass with a high melting point, larger amounts of fining agent than would normally be necessary must be used to achieve any fining effect at all. The large amounts of fining agent are disadvantageous, particularly with arsenic and-antimony oxide, because they are highly toxic and very expensive. Moreover, the addition of fining agents can have an undesirable effect on the characteristics of the glass and increase the manufacturing costs—because the compounds in question are generally expensive.

For an optimal fining using redox fining agents, therefore, an attempt is made to keep the greatest possible percentage of the fining agent in the higher oxidation stage beyond the melting process. With some fining agents, the higher oxidation stage is not attractive for commercial use, and with other fining agents the higher oxidation stage is to a large extent reduced as early as in the batch. For the oxidation of the one fining agent or to prevent the reduction of the other fining agent, nitrate compounds are added to the batch, which nitrate compounds decompose and release oxygen.

One disadvantage of this method is that nitrates are relatively expensive components of the batch and also release environmentally harmful NOx compounds when they decompose. When they are reduced to pure nitrogen, nitrates are a source of nitrogen bubbles, which are very difficult to remove. When pure oxyfuel heating is used, they are in fact the only source for nitrogen bubbles from the melting process. The difficulty of removal of nitrogen bubbles lies in their very low solubility and diffusion constant in conventional industrial glass melts.

OBJECT OF THE INVENTION

The object of the invention is therefore to find a method for the control and setting of the redox state of redox fining agents in a glass melt, whereby the redox fining agents survive the melting process in the highest possible oxidation stage, and whereby the addition of nitrates to the glass melt can be avoided as much as possible.

An additional object of the invention is to find a corresponding device for the performance of such a method.

SUMMARY OF THE INVENTION

The invention teaches a method for the control and setting of the redox state of redox fining agents in a glass melt, in which essentially oxygen gas is blown though the glass melt during the melting process.

On continuously operated melting units, e.g. glass melting tanks, in a method claimed by the invention oxygen is blown through the glass melt in the melting area of the melting unit.

The device taught by the invention for the control and setting of the redox state or state of redox fining agents in a glass melt has blast nozzles in the melting area of a melting unit to blow oxygen through the glass melt.

The invention makes it possible to completely eliminate the above mentioned disadvantages of the addition of nitrates.

Because essentially oxygen gas is blown through the glass melt during the melting process, the redox fining agents survive the melting process in the highest possible oxidation stage and are thus available for the actual fining.

For the effective control and setting of the redox state of the redox fining agents, the oxygen gas is blown in by means of blast nozzles, in particular from bottom to top through the glass melt.

This oxygen gas can be injected by conventional blast nozzles of the type that are already in use in the glass industry to improve the transfer of heat from the upper furnace structure to the glass bath.

The number, geometric distribution and gas supply to the blast nozzles are dependent to a very great extent on the type of glass and other requirements of the respective production unit. However, the number, distribution and gas feed of the nozzles can be very easily adapted to existing conditions and melting units.

On tanks with charging ends (also called doghouses), for example, the distribution and gas supply of the nozzles can be selected, for example, so that both ahead of and at the end of the batch blanket, there are two or more rows of blast nozzles that are offset from each other at a right angle to the material flow and are operated at a rather high gas pressure. The quantity of gas can thereby be between 15 and 200 liters per hour. A number of additional blast nozzles can be distributed in the area from the back wall (wall in the melting end) to the above mentioned rows of blast nozzles, depending on the dimensions of the batch blanket. The gas feed to these nozzles is preferably less than the gas feed to the above mentioned rows of nozzles. The lower limit can thereby be set very low (less than one liter per hour) and depends on the dosing capabilities of the design and construction of the blast nozzles. The distance between the individual blast nozzles and thus the number of blast nozzles is a function of the size of the batch blanket and the width of the melting unit as mentioned above, but also a function of the depth of the glass bath, the gas feed and the viscosity of the glass.

Typical distances between conventional blast nozzles with gas flows between 10–150 liters per hour and glass bath depths of approximately 1 meter are in the range of 0.3–1.5 meters.

The oxygen gas conducted through the glass melt can thereby be used in conventional commercial purities.

The blast nozzles are preferably installed in the floor underneath the batch blanket of a continuously operated melting unit, for example of a melting tank. The nozzles are distributed on the basis of the shape of the respective batch blanket. All that is necessary is that the arrangement in question makes it possible, by blowing in oxygen gas and the currents thereby generated inside the glass melt, not to have any unmelted batch residue transported into the fining area of the tank.

These blast nozzles are supplied with oxygen gas so that the oxygen from the nitrate decomposition is replaced by the oxygen gas from the blast nozzles.

The injection of oxygen gas during the melting process also has the advantage that the batch, as a result of the higher velocity gradients, is fused with the same intensity at lower temperatures. As a result, it is also possible to keep a higher percentage of the redox fining agent in the higher oxidation stage beyond the melting process for the fining process.

The above-discussed embodiments of the present invention will be described further hereinbelow. When the word "invention" is used in this specification, the word "invention" includes "inventions", that is the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention will now be explained in greater detail with reference to examples in conjunction with the drawing.

DESCRIPTION OF THE PREFERRED EMBODIMENT

Figure 1:
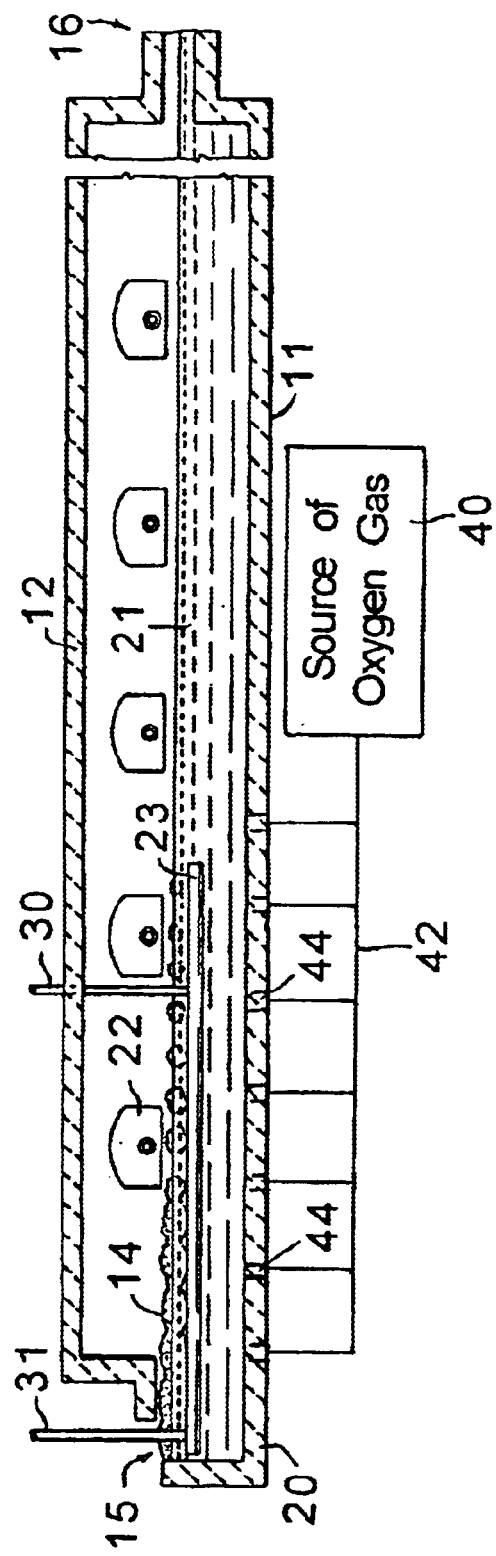
FIG. 1 schematically illustrates a horizontal cross-sectional view of a conventional, continuously fed, cross-tank fired, glass melting furnace.

Referring to FIG. 1, there is illustrated a horizontal cross-sectional view of a conventional, continuously fed, cross-tank fired, glass melting furnace having an enclosure formed by a bottom 11, roof 12, and sidewalls 13 made of refractory materials. Glass batch material 14 is introduced through inlet opening 15 in an extension 20 of the furnace known as the fill doghouse. The batch may be introduced intermittently by feeding means (not shown) to form a ridged blanket floating on the surface of the molten glass 21 as shown, or it may be fed continuously to form a uniform blanket. Usually the most effective practice is to feed the batch across approximately the central two-thirds of the furnace width so as to concentrate the unmelted batch in the hottest regions of the furnace and to initially space the batch from the sidewalls. With the extra protection of the sidewalls provided in this embodiment, the blanket may, in some cases, be located closer to the sidewalls if thermal conditions permit. Overall progression of the glass is from left to right, toward a longitudinally displaced outlet opening 16 at the opposite end of the furnace from the inlet opening. Heat is provided by flames issuing from burner ports 22 spaced along the sidewalls, which are directed onto and across the molten glass.

Oxygen is introduced from a source of oxygen schematically identified by reference numeral 40 through line or lines 42 and through ports 44 in wall 11. Fining agents may be introduced with the batch or separately.

FIG. 1 is a copy of the FIG. 1 from U.S. Pat. No. 3,941,576 issued to Welton, Jr. on Mar. 2, 1976. U.S. Pat. No. 3,941,576 is hereby incorporated as if set forth in its entirety. The Figure for this U.S. Pat. No. 3,941,576, essentially reproduced herein as FIG. 1, indicates arrangements that are well known in the art.

Exemplary Embodiment

In a continuous glass melting unit with 900 liters melting tanks, an alumosilicate glass (e.g. Schott Robax® manufactured by Schott Glas) was melted at a throughput of 1 metric ton per day. Via two bubbling nozzles, a total of 800 liters per hour of oxygen gas were added. The batch was nitrate-free. The glass that was removed from the tank had a quality comparable to glass from phases with batches containing nitrate without blowing oxygen gas through the glass melt, and was significantly better in terms of bubble quality than glass from the reference phases without nitrate and without blowing oxygen gas through the glass melt. While the number of bubbles in the reference phase averaged approximately 10 bubbles per kilogram of glass, in the phase in which the oxygen gas was blown through the glass melt during the melting process was only approximately 3–5 bubbles per kilogram of glass.

One feature of the invention resides broadly in a method for controlling and setting the redox state of redox fining agents in a glass melt, characterized by the fact that during the melting process, essentially oxygen gas is blown through the glass melt.

Another feature of the invention resides broadly in a method for controlling and setting the redox state of redox fining agents in a glass melt, characterized by the fact that in the melting portion of a continuously operated melting unit, essentially oxygen gas is blown through the glass melt.

Yet another feature of the invention resides broadly in a method characterized by the fact that the oxygen gas is blown through the glass melt by means of blast nozzles, in particular from bottom to top.

Still another feature of the invention resides broadly in a method, characterized by the fact that the oxygen gas is blown through the glass melt in the area underneath the batch blanket floating on the glass melt.

A further feature of the invention resides broadly in a method, characterized by the fact that the addition of nitrate compounds to the glass melt is essentially omitted.

Another feature of the invention resides broadly in a device for the control and setting of the redox condition of redox fining agents in a glass melt, characterized by the fact that blast nozzles for the injection of oxygen gas through the glass melt are located in the melting area of a melting unit.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The following references cited in the Search Report issued by the German Patent Office on Apr. 19, 2001, namely U.S. Pat. No. 4,545,800 issued to Won et al on Oct. 8, 1985 and German Patent No. 4207059, corresponding to U.S. Pat. No. 5,509,951 issued to Baucke et al. on Apr. 23, 1996, and their equivalents are hereby incorporated by reference as if set forth in their entirety herein.

The corresponding foreign patent applications, namely, Federal Republic of Germany Patent Application No. 100 42 771.5-45, filed on Aug. 31, 2001, having inventors Dr. Wolfgang MUSCHIK, Dr. Hildegard RÖMER, Rainer EICHHOLZ, Paul KISSL, Johann COLLIGNON, and Reinhard ZINTL, and DE-OS 100 42 771.5-45, having inventors Dr. Wolfgang MUSCHIK, Dr. Hildegard RÖMER, Rainer EICHHOLZ, Paul KISSL, Johann COLLIGNON, and Reinhard ZINTL, and DE-PS 100 42 771.5-45, having inventors Dr. Wolfgang MUSCHIK, Dr. Hildegard RÖMER, Rainer EICHHOLZ, Paul KISSL, Johann COLLIGNON, and Reinhard ZINTL, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The following U.S. patents are to be incorporated by reference herein as follows: U.S. Pat. No. 6,021,774, having inventors Taplan et al., issued on Feb. 8, 2000; U.S. Pat. No. 6,148,812, having inventors Taplan et al., issued on Nov. 21, 2000; U.S. Pat. No. 6,002,112, having inventors NAB et al., issued on Dec. 14, 1999; U.S. Pat. No. 6,111,229, having inventor Schultheis, issued on Aug. 29, 2000; U.S. Pat. No. 6,050,176, having inventors Schultheis et al., issued on Apr. 18, 2000; and U.S. Pat. No. 6,236,024, having inventors Gotz et al., issued on May 22, 2001, are hereby incorporated by reference as if set forth in their entirety herein.

The following U.S. Patent Application is to be incorporated by reference as follows: U.S. patent application Ser. No. 09/522,460, entitled, "Cooking unite, such as a stove, for cooking food," having inventors Dipl.-Ing. Michael MUSKALLA, Keramik-Ing. Werner HOTTUM, and Dipl.-Ing. Bernd SCHULTHEIS, filed on Mar. 9, 2000 is hereby incorporated by reference as if set forth in its entirety herein.

A further foreign patent publication application, namely, Federal Republic of Germany Patent Application No. DE 199 10 467.0-16, corresponding to the U.S. application mentioned in the immediately preceding paragraph, filed on Mar. 10, 1999, [NHL-SCT-10] having inventors Dipl.-Ing. Michael MUSKALLA, Keramik-Ing. Werner HOTTUM, and Dipl.-Ing. Bernd SCHULTHEIS, and DE-OS 199 10 467.0-16 and DE-PS 199 10 467.0-16, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The following U.S. patent application is to be incorporated by reference as follows: U.S. patent application Ser. No. 09/758,953, entitled, "Stove or grill for cooking, and stove or grill for cooking having a glass ceramic cooktop or hob, and a glass ceramic plate cooktop or hob for use in a stove or grill," having Attorney Docket No. NHL-GAI-01 US, having inventors Ioannis KOSMAS, Dietmar WENNEMANN, and Joachim GRUTZKE, filed on Jan. 11, 2001 is hereby incorporated by reference as if set forth in its entirety herein.

A further foreign patent publication application, namely, Federal Republic of Germany Patent Application No. DE 100 00 657.4-16, corresponding to the U.S. patent application referred to in the immediately preceding paragraph, filed on Jan. 11, 2000, [NHL-GAI-01] having inventors Ioannis KOSMAS, Dietmar WENNEMANN, and Joachim GRUTZKE, entitled, "Glaskeramikplatte," and DE-OS 100 00 657 and DE-PS 100 00 657, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The following U.S. patent application is to be incorporated by reference as follows: U.S. patent application Ser. No. 09/866,989, entitled, "Method of treating a smooth-top kitchen ceramic or glass ceramic cooktop cooking surface of a smooth-top kitchen ceramic or glass ceramic cooktop or a stove having a ceramic or glass ceramic cooktop cooking surface, and a device therefor," having inventors Bernd SCHULTHEIS and Monica DE WITZMANN, filed on May 29, 2001 is hereby incorporated by reference as if set forth in its entirety herein.

A further foreign patent publication application, namely, Federal Republic of Germany Patent Application No. DE 100 26 824.2-15, corresponding to the U.S. patent application referred to in the immediately preceding paragraph, filed on May 30, 2000, [NHL-GAI-02] having inventors Bernd SCHULTHEIS and Monica DE WITZMANN, entitled, "Reinigungsschaber," and DE-OS 100 26 824 and DE-PS 100 26 824, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The following U.S. patents being of interest in connection with cooktops are to be incorporated by reference herein as follows: No. 6,024,084, having inventor Gerhardinger, issued on Feb. 15, 2000, entitled, "Double sided heat barrier glass with clear CVD coating and method of making the same"; U.S. Pat. No. 5,958,272, having inventors Taplan et al., issued on Sep. 28, 1999, entitled, "Cooktop with a glass or glass ceramic cooking surface" ; and U.S. Pat. No. 4,413,171, having inventor Klammers, issued on Nov. 1, 1983, entitled, "Electric cooking oven for domestic use," are hereby incorporated by reference as if set forth in their entirety herein.

Some examples of stoves and ranges which may possibly be utilized or possibly adapted for use in at least one possible embodiment of the present invention may be found in the following U.S. Pat. No. 5,083,010, having inventors Henry et al., issued on Jan. 21, 1992; U.S. Pat. No. 4,601,279, having inventor Guerin, issued on Jul. 22, 1986; U.S. Pat. No. 4,493,976, having inventor Wilson, issued on Jan. 15, 1985; U.S. Pat. No. 4,292,501, having inventor Maitenaz, issued on Sep. 29, 1981; U.S. Pat. No. 5,213,091, issued on May 25, 1993; U.S. Pat. No. D336,210, issued on Jun. 8, 1993; U.S. Pat. No. 5,280,152, issued on Jan. 18, 1994; U.S. Pat. No. 5,290,997, issued on Mar. 1, 1994; U.S. Pat. No. 5,400,765, issued on Mar. 28, 1995; U.S. Pat. No. D359,345, issued on Jun. 13, 1995; U.S. Pat No. D361,015, issued on Aug. 8, 1995; and U.S. Pat. No. 5,464,005, issued on Nov. 7, 1995. The aforementioned patents are hereby incorporated by reference as if set forth in their entirety herein.

Some examples of burners and related components which may possibly be utilized or possibly adapted for use in at least one possible embodiment of the present invention may be found in the following U.S. Pat. No. 4,758,710, issued on Jul. 19, 1988; U.S. Pat No. 4,899,723, issued on Feb. 13, 1990; U.S. Pat. No. 5,186,158, issued on Feb. 16, 1993; U.S. Pat. No. D333,943, issued on Mar. 16, 1993; U.S. Pat. No. 5,323,759, issued on Jun. 28, 1994; U.S. Pat. No. 5,329,918, issued on Jul. 19, 1994; U.S. Pat. No. 5,397,234, issued on Mar. 14, 1995; U.S. Pat. No. 5,397,873, issued on Mar. 14, 1995; U.S. Pat. No. 5,400,765, issued on Mar. 28, 1995; and U.S. Pat. No. 5,437,262, issued on Aug. 1, 1995. The aforementioned patents are hereby incorporated by reference as if set forth in their entirety herein.

Some examples of related components for stoves and ranges which may possibly be utilized or possibly adapted for use in at least one possible embodiment of the present invention may be found in the following U.S. Pat. No. 5,220,155, issued on Jun. 15, 1993; U.S. Pat. No. 5,245,159, issued on Sep. 14, 1993; U.S. Pat. No. 5,343,020, issued on Aug. 30, 1994; U.S. Pat. No. 5,377,660, issued on Jan. 3, 1995; U.S. Pat. No. 5,380,985, issued on Jan. 10, 1995; and U.S. Pat No. 5,400,766, issued on Mar. 28, 1995. The aforementioned patents are hereby incorporated by reference as if set forth in their entirety herein.

Some examples of cooking hobs and cooktops which may possibly be utilized or possibly adapted for use in at least one possible embodiment of the present invention may be found in the following U.S. Pat. No. 5,406,932, issued on Apr. 18, 1995; U.S. Pat. No. 5,422,460, issued on Jun. 6, 1995; U.S. Pat. No. 5,424,512, issued on Jun. 13, 1995; U.S. Pat. No. 5,425,353, issued on Jun. 20, 1995; U.S. Pat. No. 5,429,114, issued on Jul. 4, 1995; and U.S. Pat. No. 5,448,036, issued on Sep. 5, 1995. The a patents are hereby incorporated by reference as if set forth in their entirety herein.

Some examples of ceramic plates or hot plates which may be possibly utilized or possibly adapted for use in at least one possible embodiment of the present invention may be found in the following U.S. Pat. No. 3,596,650, issued on Aug. 3, 1971; U.S. Pat. No. 3,870,861, issued on Mar. 11, 1975; U.S. Pat. No. 4,414,465, issued on Nov. 8, 1983; U.S. Pat. No. 4,634,841, issued on Jan. 6, 1987; and U.S. Pat. No. 5,397,873, issued on Mar. 14, 1995. The aforementioned patents are hereby incorporated by reference as if set forth in their entirety herein.

All of the references and documents, cited in any of the documents cited herein, and the references they are in turn cited in are hereby incorporated by reference as if set forth in their entirety herein. All of the documents cited herein, referred to in the immediately preceding sentence, include all of the patents, patent applications and publications cited anywhere in the present application. All of the references included herein as aforesaid include the corresponding equivalents published by the United States Patent and Trademark Office and elsewhere.

With respect to ranges mentioned herein, Applicants contemplate that every increment between the endpoints of ranges disclosed herein, for example, temperature ranges in degrees Celsius, feed rate ranges of gas in liters per hour, distance ranges in meters, and so forth is encompassed herein as if it were specifically stated.

For example, with respect to a temperature range of about 1150 degrees Celsius to about 1500 degrees Celsius, this is to be understood to include, within the range of degrees Celsius, steps of degrees Celsius in at least one degree Celsius, or smaller, such that any one degree Celsius may be a limit of a diminished range of degrees Celsius, that is, the range encompasses about one degree Celsius increments thereby specifically including about 1151 degrees Celsius, 1152 degrees Celsius, and so forth, and 1499 degrees Celsius.

For example, with respect to the feed range of gas between 15 and 200 liters per hour, this is to be understood to include, within the range of liters per hour, steps of liters per hour in steps of at least one liter per hour, or smaller, such that any one liter per hour may be a limit of a diminished range of liter per hour, that is, the range encompasses about 1 liter per hour increments thereby specifically including 16 liters per hour, 17 liters per hour and so forth, and 199 liters per hour.

Further, for example, with respect to the distance range in meters, of about 0.3 meters to about 1.5 meters, this is to be understood to include, within the range of meters, steps of centimeters in at least one centimeter, or smaller, such that any one centimeter or meter may be a limit of a diminished range of centimeters or meters, that is, the range encompasses about one centimeter increments thereby specifically including about 0.4 meters, 0.5 meters, 0.6 meters and so forth, 1.4 meters.

The trademark ROBAX® of the firm SCHOTT GLAS, refers to a crystallizable Li-Al-silicate glass. Thus, ROBAX® comprises the word mark ROBAX® registered for SCHOTT GLAS under U.S. Pat. No. 1,804,139 of Nov. 16, 1993, for the goods and services: glass or glass ceramic working pads for use in household kitchens; namely, cutting boards; glass or glass ceramic inspection and cover panels, inspection and viewing windows for baking ovens, industry furnaces, incinerators, room heaters, chimneys and stoves; glass or glass ceramic heating elements; namely, hot trays, room heaters and the like; glass or glass ceramic cover plates for heating elements and lights; namely, barbecues, drip trays, ultraviolet radiation shields, heat resistant cover panels for lights; glass or glass ceramic working pads for use in industrial plants; namely, soldering pads; glass or glass ceramic inspection and safety plates for use in chemical separation processes, process measurements and process control; glass or glass ceramic working pads for laboratory use.

A further trademark registration for ROBAX® comprises U.S. Pat. No. 1,251,064 of Sep. 13, 1983, for goods and services: inspection windows and cover plates made of transparent glass ceramic for use in solid fuel stoves-and wood burning stoves, in chimneys and industrial furnaces and in gas and electric radiant heaters.

Some other brands of SCHOTT GLAS, the assignee of the present invention, having an address at Hattenbergerstrasse 10, D-55122 Mainz, Federal Republic of Germany, and a U.S. address comprising: SCHOTT CORPORATION, 3 Odell Plaza, Yonkers, N.Y. 10701, are as follows:

AMIRAN®, comprising: exterior storefront glazings, projection booth windows, glazings for restaurants with a view, film/video production studio glazings, control tower windows for airports, glazings for large museum displays, windows for observation and security booths, glazings for zoos, special exhibits and displays, glass covers for cash machines.

AR-Glas®, comprising: special glass tubing of hydrolytic class 3 for the production of pharmaceutical primary packaging (e.g. for solid oralia) for the medical profession (pipettes, test tubes, disposables), as well as for the cosmetic and food industry.

ARTISTA®, comprising: fusible glass available in a range of brilliant colors which can be fused together on a large sheet of glass in an oven. Currently ARTISTA® is the only fusible glass suitable for large panes of glass.

The ATHERMAL® active-filters switch in fractions of a second automatically to the suitable protection level, according to the brightness of the welding arc, i.e., more security for the eyes.

BlueLine®, comprising: electrodes in laboratories; approximately 95% of all laboratory applications for pH- and Redox potential specifications measurements are covered by 14 different electrode models. This simplifies the selection process for the user.

BOROFLOAT®, comprising: flat glass highly resistant to water: neutral, acidic, and saline solutions; as well as chlorine, bromine, iodine and organic substances. Even over long periods of time and at temperatures exceeding 100 degrees Celsius, BOROFLOAT® exceeds the chemical resistance of most metals and other materials.

CERAMAT®, comprising a highly permeable, high performance burner medium for gas-fired residential and industrial applications; ceramic fibers are formed into a mat structure, coated with silicon carbide in a CVD/CVI process, and welded at points of contact. The result: a burner surface with outstanding characteristics.

CERAN® glass-ceramic panel. CERAN® glass-ceramic panels offer a revolutionary kind of cooking surface and are the key element of today's state-of-the-art smoothtop ranges. Black CERAN® panels are translucent, smooth, pore-free and stay attractive through years of use. A unique combination of performance characteristics makes the CERAN® glass-ceramic panel an ideal cooktop surface.

CERAQUICK®, comprising a cleaner for stove tops.

CONTURAN®, comprising: CONTURAN® Standard, made of conventional float glass; CONTURAN® Magic, made of white float glass; CONTURAN® Grey, made of grey float glass; CONTURAN® EL, made of spray-coated float glass.

DURAN® comprises: a borosilicate glass, type 3.3, conforming to ISO 3585 and meeting the most important international standards such as those found in the United Kingdom, Germany, France and America. High chemical resistance and low thermal expansion, giving a high resistance to thermal shock, are the principal properties of DURAN®.

DUROBAX®, comprising: chemically highly resistant special glass tubing of hydrolytic class 1, especially suitable for processing into pipettes, test tubes, whole-glass and record syringes.

ESTAX® 8838, comprising: special glass tubing of hydrolytic class 1 with especially low background radiation suitable for processing into test containers (scintillation vials) in actinometers.

FIOLAX®, comprising: clear and amber, chemically highly resistant neutral glass tubes of hydrolytic class 1 for processing into ampules, syringes, vials and other pharmaceutical primary packaging. The low transmission of FIOLAX®-amber guarantees a high degree of protection against light.

FORTADUR®, comprising: fiber-reinforced glass blown or molded—heat resistant borosilicate hollowware, coffee machine carafes (also available with glued-on handle), baby bottles, microwave rotating plates, glass for washing machine windows, cylinders for camping lanterns and hurricane lamps, special glass tubing for processing, glass domes for anniversary clocks.

FOTURAN® photo-etchable glass, comprising: a material for micro-technology, FOTURAN® is a photosensitive glass. This characteristic enables it to be structured for a variety of purposes. The main difference between FOTURAN® and ceramic materials is that FOTURAN® is pore-free. Its temperature stability and chemical resistance are notably higher than those of plastics. In comparison to metals, FOTURAN® shows better corrosion resistance, is electrically insulating and has a lower thermal conductivity. Its advantages over silicon are its availability in a wide variety of dimensions; it can be structured in various geometries; and, above all, has considerably higher breaking strength.

IMERA®, comprising: a smooth, body-tinted glass which can be refined by using a wide variety of techniques: cutting, grinding, drilling, sandblasting, silvering or shaping. This means that IMERA® is not only suitable for glazing large areas with colored glass. It provides a host of individual design opportunities especially in the design of decorative objects. IMERA® can also be used to produce laminated safety glass and insulating glass.

JENA VITROPACK®, comprising: ampules for the pharmaceuticals and cosmetic industries.

MAGIRA® is versatile in its applications; it is a stylish glass which comes into its own, especially in windows, doors and furniture. MAGIRA® can also be used for partitions and lamps. Because of its uniform thickness and the sizes available, this finely structured glass is also recommended for leaded lights and lamination. MAGIRA® can also be used to make laminated safety glass and insulating glass.

MAXOS® safety sight glasses are used all over the world whenever visual inspections under extreme temperature or pressure conditions in steam vessels, pressure tanks or pipeline systems are required. The high safety level is secured by special borosilicate glass of high chemical durability, exceptional purity and homogeneity. Together with the low thermal expansion which is typical for borosilicate glass, thermal pre-stressing (tempering) creates a particularly high resistance to sudden changes in temperature. The MAXOS® product line comprises a complete range of round and long sight glass in varying dimensions and resistances to accommodate different pressure points and temperature ranges.

MIROGARD Protect®, comprising: laminated glass which is only 4 mm, 6 mm, 8 mm thick and provides highest possible UV protection with no adverse effect on color rendition including the proven properties of MIROGARD Protect®.

OPALIKA®, comprises white opal on a clear glass base. Available in a range of thicknesses and suitable for toughening, this product provides an even spread of diffused light with minimal shadowing effect.

PURFORM®, comprising: ampules, vials, syringe cartridges; Schott Type 1 plus vials; PURGARD® transparent aerosol containers; Schott Parenta prefillable syringe systems.

PYRAN® S, comprising: fire resistant glass (integrity); PYRAN® S fire resistant glass combines outstanding resistance to heat and thermal shock in large panel sizes with excellent optical float quality providing distortion-free vision. And, as it is not wired or laminated, it stays clear at all times—even when subjected to a fire. PYRAN® S fire resistant glass is a Class A safety glass to BS 6206:1981 and has been extensively tested in a wide variety of sizes and with numerous combinations of frames and glazing materials for over 120 minutes integrity. With PYRAN® S, SCHOTT GLAS developed the first fire resistant butt-jointed glazing system which permits unlimited runs of fire resistant glazing by the elimination of obtrusive mullions. The butt-joint system is especially suitable for sports stadia, prestige build, museums, atria and leisure centers.

PYRANOVA®, comprising: fire resistant glass (integrity and insulation). PYRANOVA® provides 30 minutes integrity and full insulation in both steel and timber frames, as defined in BS 476 Part 22. Thanks to the special gel interlayer the same 16 mm thick PYRANOVA® can be used for both internal and external applications, no extra protection from laminated glass is necessary. PYRANOVA® also has optimum sound reduction properties. The standard version of PYRANOVA® complies with particularly high sound insulation requirements of up to RW=43 dB.

SUPRAX® 8488, comprises excellent chemical, thermal and mechanical properties with high resistance to changes in temperature. SUPRAX® 8488 is chemically durable and has a coefficient of thermal expansion of a=4.3×10$^{-6}$ k$^{-1}$. Both properties are standards in manufacturing high quality MAXOS®-safety sight glasses which, for example, are essential in boilers and high-pressure vessels.

SCHOTT-SYSTEM® comprises: lighting units, multi branch glass fiber light guides, optical systems, optical color filters.

TopPac® containers are made of Cyclo-Olefin Copolymer (COC) developed from Hoechst's subsidiary from Ticona. The high-tech pure polyolefin is as transparent as glass; it has a low density, a high stiffness and heat deflection temperature, a good chemical resistance; it can be sterilized in various ways and it has good barrier properties (low water vapor absorption). COC plastic provides greater design flexibility than glass and higher resistance to breakage.

UROH9®, comprising: lighting filters for black lights, heat filters, tanning machines.

ZERODUR®, comprising: applications such as laser technology where it is used for mirror substrates in micro lithography and other important optical components. Astronomical and x-ray telescope mirrors are prime examples of some applications among many others.

ZWIESEL®, comprising: stemware, glassware and giftware, serveware, glassware for formal and casual table settings, glassware for everyday use, barware, decorative accessories, such as vases, bowls and candlesticks, glassware for all types of catering trade, from hotels to airlines, cooking, roasting and baking accessories and glass bowls, microwave oven accessories and glass turntables, teapots and tea glasses, pitchers, coffee and tea carafes (also available with glued-on handles) and hand crafted art items, promotional support materials, colored glass rods, blown and molded heat resistant borosilicate hollowware.

In the United States, glass manufacturing furnaces generally fall into three broad classes of furnaces: container glass furnaces, flat glass furnaces, and fiber glass furnaces. The container glass furnaces produce approximately 65 percent of all the glass manufactured in the United States and typically either have an end port design or a side port design. The flat glass furnaces produce about 20 percent of the glass in the United States and mainly employ either a float glass method or an energy and labor intensive flat glass method. The fiber glass and specialty glass furnaces are generally smaller than the other types of furnaces and produce approximately 20 percent of the glass in the United States.

Raw materials are selected according to purity, supply, pollution potential, ease of melting, and cost. Sand is the most common ingredient. In the United States, approximately 90% of the quality sand produced is consumed by the glass industry. Both purity and grain size are important. Iron oxide, titania, and zirconia are the primary contaminants, but high concentration of feldspars from sands in the western United States account for large amounts of alumina and in glasses from that area. Acid-washed varieties offer the lowest iron concentration. Container-glass manufacturers generally use sand between 590 and 840 micrometers (20–30 mesh) for the best compromise between the high cost of producing fine sand and melting efficiency. Fiber glass manufacturers, however use a fine grain sand, less than 70 micrometers (200 mesh). Both agglomerated fine sand grains and undissolved coarse sand grains may cause melting problems. Shipping costs are often 3–4 times the original cost of the sand, therefore the plant should be near the sources of raw materials.

Limestone is the source of calcium limestone and consists primarily of calcite (95% $CaCO_3$) or as a dolomitic lime stone, a mixture of dolomite, $CaMg(CO_3)_2$, and calcite. High quality limestones contain less than 0.1% $Fe_2O_3$ and approximately 1% silica and alumina. The mineral aragonite (98% $CaCO_3$) is another source of CaO. Large deposits of high purity aragonite exist near the coast of the Bahamas.

The amount of soda ash, $Na_2CO_3$, produced by the Solvay process has decreased, and most soda ash now comes from the Trona, Wyoming deposits (trona, $Na_2CO_3 \cdot NaHCO_3 \cdot 2H_2O$). Caustic soda, NaOH, solutions may be used in wet sensitive batching processes as a source of soda Other raw materials include boron, generally from deposits located in California or Turkey. Either anhydrous borax or boric acid is used, but their consumption is decreasing because of the energy required to produce them. Mineral ores such as colemanite, rasorite, or ulexite are now used in addition to boric acid or pentaaquo borax, $Na_2B_4O_7 \cdot 5H_2O$, when possible. Feldspar and nepheline syenite are common mineral sources of alumina. Litharge is used as a source of lead oxide for the manufacture of lead glasses. Sulfates or nitrates oxidize other oxides in the glass and control fining reactions.

Powdered anthracite coal is a common reducing agent in glass manufacture. Fining agents remove the bubbles in the molten glass and include sulfates, halides, peroxides, chlorates, perchlorates, $CeO_2$, $MnO_2$, $As_2O_3$, and $Sb_2O_3$. They react by release of oxygen or sulfur trioxide, or by vaporization as in the case of halides.

The following general comments are made with respect to oxidation-reduction (redox). Oxidation was originally simply regarded as a chemical reaction with oxygen. The reverse process —loss of oxygen—was called reduction. Reaction with hydrogen also came to be regarded as reduction. Later, a more general idea of oxidation and reduction was developed in which oxidation was loss of electrons and reduction was gain of electrons. This wider definition covered the original one. For example, in the reaction $$4Na(s)+O_2(g) \rightarrow 2Na_2O(S)$$

the sodium atoms lose electrons to give Na+ ions and are oxidized. At the same time, the oxygen atoms gain electrons and are reduced. These definitions of oxidation and reduction also apply to reactions that do not involve oxygen. For instance in $$2Na(s)+Cl_2(g) \rightarrow 2NaCl(s)$$

the sodium is oxidized and the chlorine reduced. Oxidation and reduction also occurs at the electrodes in cells.

This definition of oxidation and reduction applies only to reactions in which electron transfer occurs, i.e., to reactions involving ions. It can be extended to reactions between covalent compounds by using the concept of oxidation number (or state). This is a measure of electron control that an atom has in a compound compared to the atom m the pure element. An oxidation number consists of two parts: (1) its sign, which indicates whether the control has increased (negative) or decreased (positive); (2) its value, which gives the number of electrons over which control has changed.

The change of electron control may be complete (in ionic compounds) or partial (in covalent compounds). For example, in $SO_2$ the sulphur has an oxidation number +4, having gained partial control over 4 electrons compared to sulphur atoms in pure sulphur. The oxygen has an oxidation number −2, each oxygen having lost partial control over 2 electrons compared to oxygen atoms in gaseous oxygen. Oxidation is a reaction involving an increase in oxidation number and reduction involves a decrease. Thus in $$2H_2 + O_2 \rightarrow 2H_2O$$

the hydrogen is oxidized and the oxygen is reduced.

The oxidation number is used in naming inorganic compounds. Thus in $H_2SO_4$ sulphuric(VI) acid, the sulphur has an oxidation number of +6. Compounds that tend to undergo reduction readily are oxidizing agents; those that undergo oxidation are reducing agents.

Commercial production of glass conventionally involves feeding raw glass batch materials into an opening at one end of an elongated melting furnace while withdrawing melted glass through an opening at the opposite end of the furnace. When exposed to the high temperature conditions within the melting furnace, the raw materials undergo chemical reactions and dissolution which normally take place within the first portion of a continuous glass melting furnace. The remainder of the furnace is devoted to "fining" (or "refining") and conditioning the glass melt. The process of fining includes the removal of gaseous products of reaction or other entrained gases from the melt by providing conditions which cause the gases to be driven from the molten glass. High temperature is one of the conditions that enhances fining, and for that reason the heat sources in a melting furnace are often arranged to provide the peak temperature downstream from the initial melting zone. Failure of the glass to be adequately fined can result in the undesirable presence of bubbles or "seeds" in the glass product. Glass makers conventionally include in the mixture of batch materials being fed to a melting furnace at least one compound that is intended to serve as a fining aid or agent. A fining agent is characterized by its tendency to dissociate at relatively high temperatures, whereby it dissociates and forms substantial volumes of gas into which undesired species of gas diffuse and thereby more readily escape from the melt. Compounds of sulfur constitute the most common refining agents, particularly sodium sulfate (salt cake) and calcium sulfate (gypsum). Other sulfates, as well as sulfides and sulfites have also been suggested as fining agents. Injecting $SO_2$ gas directly into the melting glass is proposed in U.S. Pat. No. 3,375,095 (Poole). Regardless of the form in which the sulfur is introduced into the melt, most of the sulfur is converted to sulfate, sometimes expressed equivalently as $SO_3$ concentration, in which form a portion remains dissolved in the glass and the remainder dissociates, forming $SO_2$ and $O_2$. Carbonaceous material, usually powdered coal, is sometimes included in the batch mixture so as to increase the amount of sulfur that dissociates from the melting glass with the intention of enhancing the fining effect.

Ideally, the fining agent would dissociate when it is desired to begin the fining process, i.e., after the initial melting of the batch materials, as the melt enters the zone of peak temperature. Unfortunately, fining agents often begin dissociating as soon as they are exposed to the heat of the furnace and the reducing conditions produced by the presence of reducing agents such as carbon that are included in the batch mixtures. As a result, there is premature dissociation of the refining agent before the glass enters the fining zone. In order to provide sufficient fining agent for the downstream fining process, it has then been necessary to include excess fining agent in the batch mixture to compensate for the losses in the early melting stages. As a result, considerably more of products of the dissociation of the fining agent enter the exhaust gas stream from the furnace than is required for the fining process itself. The emissions from most fining agents are considered to be environmentally detrimental, and costly exhaust gas treatment is often required to avoid excessive discharge of these emissions to the atmosphere. Accordingly, it would be desirable to reduce the amount of refining agent required. One approach to reducing the amounts of fining agent used is disclosed in U.S. Pat. No. 4,138,235 (Turner), but further reductions would be desirable.

Some colored glasses require that the reduction/oxidation ("redox") state of the melt be controlled so as to be relatively reducing so that certain multivalent colorant ions are induced to be present in the glass in their lower valence state. Iron is frequently used as a colorant in glass, and it is known that melting the glass under reducing conditions enhances the amount of the iron that is in the ferrous state rather than the ferric state, with the result that the glass is more absorbing in the infrared range of the spectrum. This is very desirable for glass that is intended to reduce the heat gain into enclosures such as buildings or automobiles. One prior art attempt to increase the infrared absorption of glass by increasing the amount of ferrous iron entailed including larger total amounts of iron in the glass. This approach is limited by the difficulty of melting glass with large amounts of iron due to lowered heat transfer. Using a moderate amount of iron and attempting to drive more of it to the ferrous state by providing a reducing environment in the melter by including a reducing agent (such as powdered coal or other carbon source) in the batch materials or by firing the furnace with an excess of fuel has also been less than successful because of inadequate fining. Production of relatively reduced glass by introduction of reductant with the batch mixture can lead to premature dissociation of the fining agents so that amounts remain at the fining zone, with the consequence that fining may be inadequate. Specialized melting and fining means as disclosed in U.S. Pat. No. 4,792,536 (Pecoraro and Shelestak) can avoid these problems, but it would be desirable to be able to produce reduced glasses with the large capacity of conventional glass melting furnaces presently available.

U.S. Pat. No. 2,330,324 (Adams) discloses a process of first bubbling carbon monoxide (a reducing agent) through a pot of glass and then bubbling oxygen, the combined effect of which is said to improve fining of the glass and to produce clear glass. That patent also describes the former practice of throwing carbonaceous objects such as potatoes or blocks of wood into a glass melt to temporarily increase the local fining action. Such an erratic technique is not considered suitable for a large scale, continuous glass melting operation.

U.S. Pat. No. 2,387,222 (Wright) discloses bubbling gas into molten glass in a melting and fining furnace for the purpose of controlling the circulation of glass in the furnace. It is disclosed that the gas may be oxidizing, reducing, or neutral. The purpose for using a reducing gas is stated to be "to retain certain colorants." There is no disclosure of which colorants are contemplated nor of an explanation as to how a colorant would be retained by making the glass more reducing.

U.S. Pat. No. 2,254,079 (McAlpine) proposes assisting the fining process by bubbling gases through molten glass in a fining zone of reduced depth. Carbon monoxide is one of the gases suggested as being usable in this process, although a troublesome brown coloration is described as requiring subsequent treatment with oxygen.

U.S. Pat. No. 2,254,079 issued to McAlpine on Aug. 26, 1941 and entitled, "Method and apparatus for forming and refining glass," U.S. Pat. No. 2,330,324 issued to Adams on Sep. 28, 1943 and entitled, "Fining of glass," U.S. Pat. No. 2,387,222 issued to Wright on Oct. 16, 1945 and entitled, "Method of refining glass," U.S. Pat. No. 3,375,095 issued to Poole on Mar. 26, 1968 and entitled, "Treatment of melting glass with $SO_2$," U.S. Pat. No. 4,138,235 issued to Turner on Feb. 6, 1979 and entitled, "Method of making flat glass with lower sulfur-containing emissions," and U.S. Pat. No. 4,792,536 issued to Pecoraro et al. on Dec. 20, 1988 and entitled, "Transparent infrared absorbing glass and method of making," are hereby incorporated by reference as if set forth in their entirety herein.

The publication, "Glastechnische Fabrikationsfehler" [Manufacturing Defects in Industrial Glass], edited by H. Jebsen-Marwedel and R. Brückner, 3rd Edition, 1980, Springer Verlag, on pages 195 ff. is hereby incorporated by reference as if set forth in its entirety herein.

Glass may be considered any of a large class of amorphous, rigid, inorganic, nonmetallic materials of widely variable compositions, mechanical properties, and optical characteristics that solidify from the molten state, usually without crystallization; typically, the compositions include silica, boric oxide, alumina, basic oxides of sodium, potassium, or other such ingredients; the products may be transparent, translucent, or opaque, colorless, or in a wide variety of colors, and often are regarded as supercooled liquids rather than true solids.

In other words, glass may be considered to be a ceramic material consisting of a uniformly dispersed mixture of silica (sand) (75%), soda ash (20%), and lime (5%), often combined with such metallic oxides as those of calcium, lead, lithium, cerium, etc., depending on the specific properties desired. The blend (or "melt") is heated to fusion temperature (approximately 700–800 degrees Celsius) and then gradually cooled (annealed) to a rigid, friable state, often referred to as vitreous. Technically, glass is an amorphous, undercooled liquid of extremely high viscosity that has all the appearances of a solid. It has almost 100% elastic recovery.

Properties of glass comprise: (Soda-lime glass) Lowest electrical conductivity of any common material (below $10^{-6}$ mho/cm). Low thermal conductivity. High tensile and structural strength. Relatively impermeable to gases. Inert to all chemicals except hydrofluoric, fluosilicic, and phosphoric acids and hot, strong alkaline solutions. Continuous highest-use temperature about 121 degrees Celsius, but may be higher, depending on composition. Good thermal insulator in fibrous form. Molten glass is extrudable into extremely fine filaments. Glass is almost opaque to UV radiation; in the absence of added colorant it transmits 95–98% of light to which it is exposed. Noncombustible. Excellent sand for glass making occurs in Virginia (James River), Pennsylvania, Massachusetts, New Jersey, West Virginia, Illinois, and Maryland; also in southern Germany and the Czech Republic.

In one possible embodiment, when the melting apparatus is in operating condition, batch glass, usually comprised of sand, lime, feldspar, and cullet may be introduced into the melting unit, apparatus or furnace.

The feed materials may possibly comprise species of the following: single phase/component silica glass and/or glasses, including vitreous silica glass and/or glasses; multi-component silicate glass and/or glasses systems; soda lime glass and/or glasses; borosilicate glass and/or glasses; aluminosilicate glass and/or glasses; lead glass and/or glasses; lead silicate glass and/or glasses; borate glass and/or glasses; phosphate glass and/or glasses; germanate glass and/or glasses; germanosilicate glass and/or glasses; other oxide glass and/or glasses, chalcogenide glass and/or glasses; halide glass and/or glasses; and metallic glass and/or glasses.

Oxygen may be substantially pure oxygen, that is, oxygen having a purity of 99% and above.

The range of oxygen may possibly be in the range of from less than 100 volume percent to less than or equal to 90 volume percent.

Mixtures may be comprised of oxygen and inert gases such as noble gases, helium, neon, argon, krypton, for example, or nitrogen, carbon dioxide, steam, possibly comprising an oxygen content of less than 100 volume percent.

In another possible embodiment, the oxygen may possibly be part of an oxygen-gas mixture with the oxygen being less than 99% of the gas mixture and possibly, depending on the type of process, the type of glass being made, the types of raw material being used for melting, the types of fining agents being added, the content of oxygen could possibly be substantially less than 99%.

Depending on the material used for melting, temperature conditions used for melting, the amount of bubbles that can be tolerated, the amount of oxygen may be possibly be less than 99% oxygen.

Under certain possible conditions, depending on the depth of the melt of molten glass, it may even be possible to use less than 99% of oxygen to maintain the predetermined oxidation state of the fining agents.

Oxygen may possibly be supplied from a plant that produces oxygen.

Oxygen may possibly be produced by in-situ production or generation.

The range of oxygen that is used may be in fractions of 1% of oxygen so that by experimentation the sufficient amount of oxygen can be determined.

Oxygen manufacturers include: BOC-North America, A Division of the BOC Group, 575 Mountain Ave., Murray Hill, N.J. 07974; and PRAXAIR, Inc., 39 Old Ridgebury Road, K, Danbury, Conn. 06810-5113.

Some examples of melting furnaces and methods of operation thereof, features of which may possibly be used or adapted for use in at least one embodiment of the invention may be found in the following U.S. Pat. No. 3,224,855 issued to Plumat on Dec. 21, 1965 and entitled, "Process and furnace for melting and working products such as glass," U.S. Pat. No. 3,237,929 issued to Plumat et al. on Mar. 1, 1966 and entitled, "Process and apparatus for heating molten materials by injection of flames into the bath," U.S. Pat. No. 3,260,587 issued to Dolf et al. on Jul. 12, 1966 and entitled, "Method of melting glass with submerged combustion heaters and apparatus therefor," U.S. Pat. No. 3,606,825 issued to Johnson on Sep. 21, 1971 and entitled, "Process of melting glass," U.S. Pat. No. 3,627,504 issued to Johnson et al. on Dec. 14, 1971 and entitled, "Method of adding colorant to molten glass," U.S. Pat. No. 3,764,287 issued to Brocious on Oct. 9, 1973 and entitled, "Method of an apparatus for melting and refining glass," U.S. Pat. No. 3,941,576 issued to Welton, Jr. on Mar. 2, 1976 and entitled, "Method and apparatus for making molten glass with batch guiding means," U.S. Pat. No. 3,941,577 issued to Schwenninger on Mar. 2, 1976 and entitled, "Method and apparatus for making molten glass," U.S. Pat. No. 4,149,022 issued to Hrycik on Apr. 10, 1979 and entitled, "Power control system for electrically melting glass," U.S. Pat. No. 4,285,718 issued to Mathias et al. on Aug. 25, 1981 and entitled, "Method of operating tubular heat exchanger for preheating pulverous glass batch," U.S. Pat. No. 4,319,904 issued to Gullett on Mar. 16, 1982 and entitled, "Method and apparatus for guiding glass batch in a glass melting furnace," U.S. Pat. No. 4,545,800 issued to Won et al. on Oct. 8, 1985 and entitled, "Submerged oxygen-hydrogen combustion melting of glass," U.S. Pat. No. 4,557,743 issued to Claes et al. on Dec. 10, 1985 and entitled, "Method of and apparatus for monitoring the redox state of elements in glass," U.S. Pat. No. 5,006,144 issued to Knavish et al. on Apr. 9, 1991 and entitled, "Melting glass with oxidation control and lowered emissions," U.S. Pat. No. 5,509,951 issued to Baucke et al. on Apr. 23, 1996 and entitled, "Process for fining oxide melts," and U.S. Pat. No. 5,632,795 issued to Brown et al. on May 27, 1987 and entitled, "Reduction of nitrogen containing glass batch materials using excess oxygen." These patents are hereby incorporated by reference as if set forth in there entirety herein.

Some examples of apparatus and methods of introducing oxygen or an oxygen-containing gas into a melt, features of which may possibly be used or adapted for use in at least one embodiment of the present invention may be found in the following U.S. Pat. No. 3,170,781 issued to Keefer and entitled, "Apparatus for feeding gaseous materials to glass melting furnaces," U.S. Pat. No. 3,738,792 issued to Feng on Jun. 12, 1973 and entitled, "Industrial burner," U.S. Pat. No. 4,043,799 issued to Carlomagno et al. on Aug. 23, 1977 and entitled, "Method and device for blowing oxygen in metal refining converters in unstationary manner," U.S. Pat. No. 4,313,799 issued to Perkins on Feb. 2, 1982 and entitled, "Oxygen sensor and method for determining the oxygen activity in molten glass," U.S. Pat. No. 4,429,402 issued to Carley on Jan. 31, 1984 and entitled, "Devices for use in a glass-melting furnace," U.S. Pat. No. 4,539,034 issued to Hanneken on Sep. 3, 1985 and entitled, "Melting of glass with staged submerged combustion," U.S. Pat. No. 4,545,800 issued to Won et al. on Oct. 8, 1985 and entitled, "Submerged oxygen-hydrogen combustion melting of glass," U.S. Pat. No. 4,600,425 issued to Krumwieder et al. on Jul. 15, 1986 and entitled, "Bubbler with protective sleeve or fluid coolant jacket," U.S. Pat. No. 4,643,403 issued to Buhrmann et al. on Feb. 17, 1987 and entitled, "Liquid-cooled lance for blowing oxygen onto a steel bath and method of operating the lance," U.S. Pat. No. 4,702,462 issued to Fritz on Oct. 27, 1987 and entitled, "Water-cooled lance for blowing oxidizing gas onto a melt," U.S. Pat. No. 5,147,438 issued to Castelain et al. on Sep. 15, 1992 and entitled, "Auxiliary oxygen burners technique in glass melting cross-fired regeneration furnaces," and U.S. Pat. No. 5,788,920 issued to Okamoto et al. on Aug. 4, 1988 and entitled, "Oxygen blowing lance capable of being used in an electric furnace." These patents are hereby incorporated by reference as if set forth in there entirety herein.

In one possible embodiment of the invention the glass may possibly comprise a Li-Al-silicate glass.

The oxygen used may possibly comprise oxygen having a purity of more than 99.5 volume percent. In another embodiment oxygen may possibly have a purity of more than 99.95 volume percent. In another embodiment oxygen may possibly have a purity of more than 99.995 volume percent. In one embodiment oxygen may possibly have a purity of more than 99.999 volume percent.

The details in the patents, patent applications and publications may be considered to be incorporable, at Applicants' option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A method of refining glass in a melting unit, said melting unit comprising a continuously operable melting unit which melting unit comprises a portion to melt a feed material, said method comprising:

producing a melt of molten glass from feed material in said portion to melt a feed material;

minimizing at least one compound of nitrate in said melt by omitting said at least one compound of nitrate in the feed material;

refining said melt by (i.), (ii.), (iii.), (iv.), and (v.):
  (i.) introducing at least one fining agent in said melt;
  (ii.) forming, in said melt, a first gas comprising at least one product of decomposition of the feed material;
  (iii.) forming, in said melt, a second gas comprising at least one product of decomposition of said at least one fining agent;
  (iv.) combining said first gas and said second gas into bubbles; and
  (v.) heating said melt to substantially remove said bubbles from said melt; and said method further comprising:

introducing by blowing, during melting, a gas, comprising substantially oxygen, into said melt, and thereby setting and maintaining the reduction-oxidation state of said at least one fining agent in said melt of molten glass in the highest reduction-oxidation state.

2. The method according to claim 1, wherein:

said introducing by blowing said gas comprises blowing said gas in said portion for melting of said melting unit, from the bottom of said melt to the top of said melt, and beneath a batch blanket disposed on the top of said melt of molten glass.

3. The method according to claim 2, wherein:

said gas is blown in a quantity sufficient and for a period of time sufficient to maintain said at least one fining agent in said highest oxidation state to refine said melt.

4. The method according to claim 3, wherein:

said gas comprises a mixture of oxygen and at least one inert gas comprising: helium, neon, argon, krypton, or nitrogen, carbon dioxide, and steam.

5. The method according to claim 4, wherein:

said oxygen is present in the range of from about 90 percent by volume to about 100 percent by volume.

6. The method according to claim 5, wherein:

said gas comprises substantially pure oxygen.

7. The method according to claim 6, wherein:

said feed material comprises a lithium-aluminum-silicate glass.

8. A method of refining molten glass free of nitrate compounds, comprising the steps of:

preparing a melt of molten glass free of nitrate compounds;

said melt comprising at least one fining agent;

introducing a gas, comprising substantially oxygen, into said melt of molten glass to set the reduction-oxidation state of said at least one fining agent in said melt of molten glass; and removing refined glass.

9. The method according to claim 8, wherein:

said gas comprises a mixture of oxygen and at least one inert gas comprising: helium, neon, argon, krypton, or nitrogen, carbon dioxide, and steam.

10. The method according to claim 9, wherein:

said oxygen is present in the range of from about 90 percent by volume to about 100 percent by volume.

11. The method according to claim 10, wherein:

said gas comprises substantially pure oxygen.

12. In a method of making glass, a method of setting and maintaining the reduction-oxidation state of fining agents in a glass melt free of nitrate compounds, said setting and maintaining method comprising:

forming a melt of molten glass free of nitrate compounds;

said melt comprising at least one fining agent; and introducing, by blowing, a gas, comprising sufficient oxygen, into said melt, to set and maintain the reduction-oxidation state of said at least one fining agent in said melt of molten glass in the highest reduction-oxidation state.

13. The method according to claim 12, wherein:

said gas comprises a mixture of oxygen an at least one inert gas comprising: helium, neon, argon, krypton, or nitrogen, carbon dioxide, and steam.

14. The method according to claim 13, wherein:

said oxygen is present in the range of from about 90 percent by volume to about 100 percent by volume.

15. The method according to claim 14, wherein:

said gas comprises substantially pure oxygen.

16. The method according to claim 8, wherein said molten glass comprises an aluminosilicate glass.

17. The method according to claim 16, wherein said gas comprises essentially oxygen.

18. The method according to claim 17, wherein said molten glass comprises a lithium-aluminum-silicate glass comprising ROBAX.

19. The method according to claim 12, wherein said molten glass comprises an aluminosilicate glass.

20. The method according to claim 19, wherein said gas comprises essentially oxygen; and said molten glass comprises a lithium-aluminum-silicate glass comprising ROBAX.

* * * * *